United States Patent
Lindberg et al.

(10) Patent No.: US 10,049,551 B2
(45) Date of Patent: Aug. 14, 2018

(54) VEHICLE DRIVER ASSIST ARRANGEMENT

(71) Applicant: VOLVO CAR CORPORATION, Gothenburg (SE)

(72) Inventors: Andreas Lindberg, Gothenburg (SE); Fredrik Olaisson, Surte (SE); Joakim Melkersson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 169 days.

(21) Appl. No.: 14/512,691

(22) Filed: Oct. 13, 2014

(65) Prior Publication Data
US 2015/0109131 A1    Apr. 23, 2015

(30) Foreign Application Priority Data

Oct. 15, 2013   (EP) .................................... 13188696

(51) Int. Cl.
G08B 23/00   (2006.01)
G08B 21/06   (2006.01)
B60K 28/06   (2006.01)

(52) U.S. Cl.
CPC ............ *G08B 21/06* (2013.01); *B60K 28/066* (2013.01)

(58) Field of Classification Search
CPC ......... G08B 21/06; B60K 28/066; B60T 7/22; B60R 16/02; B60W 50/14; B60W 50/00
USPC ....................................................... 340/576
See application file for complete search history.

(56) References Cited

U.S. PATENT DOCUMENTS

| 8,489,253 B2 * | 7/2013 | Shirakata | G08B 21/06 |
| | | | 340/576 |
| 9,409,478 B2 * | 8/2016 | Okuda | B60R 16/02 |
| 2003/0045982 A1 * | 3/2003 | Kondo | B62D 15/025 |
| | | | 701/41 |
| 2005/0030184 A1 * | 2/2005 | Victor | B60K 28/06 |
| | | | 340/576 |

(Continued)

FOREIGN PATENT DOCUMENTS

| CN | 101535079 A | 9/2009 |
| CN | 102975721 A | 3/2013 |

(Continued)

OTHER PUBLICATIONS

Extended European Search Report for EP 13188696.2, Completed by the European Patent Office, dated Apr. 16, 4 Pages.

(Continued)

*Primary Examiner* — Hoi Lau
(74) *Attorney, Agent, or Firm* — Brooks Kushman P.C.

(57) ABSTRACT

A vehicle driver assist arrangement may include an output unit and a vehicle driver attentiveness assessment arrangement. The vehicle driver attentiveness arrangement may include a host vehicle lane position evaluation unit, a steering wheel torque detection unit, a pedal pressure detecting unit, and a processing unit. The processing unit is arranged to assess a level of vehicle driver attentiveness on the basis of a first, a second and a third signal transmitted to the processing unit by the host vehicle lane position evaluation unit, the steering wheel torque detection unit, and the pedal pressure detecting unit. The output unit is arranged to issue an alert in case the assessed level of vehicle driver attentiveness is below a predetermined threshold attentiveness level.

15 Claims, 2 Drawing Sheets

(56) References Cited

U.S. PATENT DOCUMENTS

| | | | | |
|---|---|---|---|---|
| 2005/0131597 A1* | 6/2005 | Raz | G09B 19/167 | 701/29.1 |
| 2007/0115105 A1* | 5/2007 | Schmitz | B60K 31/047 | 340/439 |
| 2007/0146146 A1* | 6/2007 | Kopf | B60Q 9/008 | 340/575 |
| 2009/0322506 A1* | 12/2009 | Schmitz | B60K 28/066 | 340/439 |
| 2010/0156617 A1* | 6/2010 | Nakada | A61B 3/113 | 340/439 |
| 2010/0191422 A1* | 7/2010 | Reichert | B60K 28/066 | 701/42 |
| 2010/0274435 A1* | 10/2010 | Kondoh | B60W 40/09 | 701/31.4 |
| 2012/0035825 A1* | 2/2012 | Morita | B60T 7/22 | 701/70 |
| 2012/0212353 A1* | 8/2012 | Fung | B60K 28/06 | 340/905 |
| 2013/0124046 A1* | 5/2013 | Lazic | B60K 28/066 | 701/42 |
| 2013/0197713 A1* | 8/2013 | Yoshihama | B60W 50/10 | 701/1 |
| 2013/0207805 A1* | 8/2013 | Inada | B60K 28/066 | 340/576 |
| 2013/0226408 A1* | 8/2013 | Fung | B60W 40/09 | 701/41 |
| 2013/0261916 A1* | 10/2013 | Sekiguchi | B60T 7/22 | 701/70 |
| 2014/0249718 A1* | 9/2014 | Liu | G08G 1/16 | 701/41 |
| 2015/0039186 A1* | 2/2015 | Okuda | B60W 50/14 | 701/41 |
| 2015/0070178 A1* | 3/2015 | Kline | G08B 21/02 | 340/576 |
| 2015/0109131 A1* | 4/2015 | Lindberg | B60K 28/066 | 340/576 |
| 2015/0175001 A1* | 6/2015 | Okuda | B60R 16/02 | 701/34.4 |
| 2015/0274158 A1* | 10/2015 | Fujita | B60W 30/00 | 701/23 |
| 2016/0001781 A1* | 1/2016 | Fung | G06F 19/345 | 701/36 |
| 2016/0052524 A1* | 2/2016 | Kim | B60W 40/09 | 340/576 |
| 2016/0357185 A1* | 12/2016 | Laur | B60W 50/0098 | |

FOREIGN PATENT DOCUMENTS

| | | |
|---|---|---|
| DE | 10024227 | 12/2001 |
| JP | 2010137778 | 6/2010 |
| JP | WO2013150662 * | 10/2013 |
| WO | 2005025918 A1 | 3/2005 |

OTHER PUBLICATIONS

Chinese Patent Office, Search Report for related Chinese Patent Application No. CN2014105381423, dated Mar. 2, 2018, 2 pages.
Chinese Patent Office, Office Action for related Chinese Patent Application No. CN2014105381423, dated Mar. 19, 2018 (with English Translation), 14 pages total.

* cited by examiner

| | S1 | S2 | S3 | A |
|---|---|---|---|---|
| C1 | ■ | ■ | ■ | V -> V2, R1 |
| C2 | ■ | ■ | | V -> V2, R2 |
| C3 | ■ | | ■ | V -> V2, R3 |
| C4 | ■ | | | V -> V3, R4 |
| C5 | | ■ | ■ | V -> V3, R5 |
| C6 | | ■ | | V -> V1, R6 |
| C7 | | | ■ | V -> V1, R7 |
| C8 | | | | V -> V1, R8 |

VEHICLE DRIVER ASSIST ARRANGEMENT

CROSS-REFERENCE TO RELATED APPLICATIONS

This application claims foreign priority benefits under 35 U.S.C. § 119(a)-(d) to European patent application number EP 13188696.2, filed Oct. 15, 2013, which is incorporated by reference herein in its entirety.

TECHNICAL FIELD

The present disclosure relates to a vehicle driver assist arrangement. The present disclosure also relates a vehicle comprising a vehicle driver assist arrangement and a method of assisting a vehicle driver.

BACKGROUND

Studies have shown that a significant proportion of vehicle accidents resulting in death are caused by sudden inattention of the vehicle driver. Such accidents are often severe since sudden inattention of the vehicle driver may cause frontal collisions or other severe types of accidents. The sudden inattention may be caused by a sudden severe medical condition, such as fainting, heart attack, etc., or by the driver falling asleep. In cases where the sudden inattention of the driver is caused by a sudden severe medical condition, the medical condition of the driver itself may need immediate medical attention, which further explains the severeness of these types of accidents. If one could recognize the sudden inattention of vehicle drivers and perform actions in response thereto, a large proportion of these accidents could be avoided. However, the sudden inattention is difficult to detect and actions have to be taken within a short period of time if an accident is to be avoided. Also, a vehicle driver assist arrangement must not unnecessarily intervene or alert the driver. The document DE 10024227 A1 describes electronic monitoring of the driver's eyes and/or eyelid activity and generating an alarm signal if tiredness is electronically detected. Even if such electronic monitoring of the driver's eyes and/or eyelid activity could recognize some of the cases where sudden inattention of vehicle drivers occur, such electronic monitoring does not satisfactory recognize sudden inattention of the driver, and are therefore unable of satisfactory assisting the vehicle driver. Thus, there is a need for a vehicle driver assist arrangement with an improved accuracy in the assessment of vehicle driver attentiveness.

SUMMARY

An object of the present disclosure is to provide a vehicle driver assist arrangement with an improved accuracy in the assessment of vehicle driver attentiveness.

According to an aspect of the disclosure, the object is achieved by a vehicle driver assist arrangement comprising an output unit and a vehicle driver attentiveness assessment arrangement comprising a host vehicle lane position evaluation unit, a steering wheel torque detection unit, a pedal pressure detecting unit, and a processing unit, where the host vehicle lane position evaluation unit is arranged to detect and evaluate a host vehicle lane position and transmit a first signal indicative of a safe and/or unsafe vehicle host vehicle lane position to the processing unit, and the steering wheel torque detection unit is arranged to detect a torque exerted on the steering wheel of the vehicle hosting the arrangement and to transmit a second signal indicative of the torque exerted on the steering wheel to the processing unit, and the pedal pressure detecting unit is arranged to detect a pressure exerted on one or more pedals of the vehicle hosting the arrangement and to transmit a third signal indicative of the pedal pressure to the processing unit, where the processing unit is arranged to assess a level of vehicle driver attentiveness on the basis of the first, the second and the third signal, where the vehicle driver assist arrangement is arranged to issue an alert, via the output unit, in case the assessed level of vehicle driver attentiveness is below a predetermined threshold attentiveness level.

Since the processing unit is arranged to assess a level of vehicle driver attentiveness on the basis of the first, the second and the third signal, a vehicle driver assist arrangement is provided with an improved accuracy in the assessment of vehicle driver attentiveness.

As a result, the above mentioned object is achieved.

Also, since the vehicle driver assist arrangement is arranged to issue an alert in case the assessed level of vehicle driver attentiveness is below a predetermined threshold attentiveness level, overall driving safety is improved.

According to some embodiments, the processing unit is arranged to determine a value representative of the level of vehicle driver attentiveness, where the attentiveness level value is within a range between a first attentiveness level value corresponding to an attentiveness level in which the driver is assumed to be fully attentive and a second attentiveness level value corresponding to an attentiveness level in which the driver is assumed to be inattentive, the second attentiveness level value corresponding to the predetermined threshold attentiveness level, where the processing unit is arranged to change the attentiveness level value with a predetermined rate of change on the basis of the first, the second and the third signal. Since the second attentiveness level value corresponds to the predetermined threshold attentiveness level, the vehicle driver assist arrangement is arranged to issue an alert, via the output unit, in case the attentiveness level value is at the second attentiveness level value or assumes a value not being in-between the first and the second attentiveness level values and closer to the second attentiveness level value than the first attentiveness level value. Since, the processing unit is arranged to change the attentiveness level value with a predetermined rate of change on the basis of the first, the second and the third signal, the attentiveness level value may be changed towards the first or the second attentiveness level value with a predetermined rate of change, and may therefore, on the basis of the first, the second and the third signal, after a certain time has elapsed be changed to the second attentiveness level value where the vehicle driver assist arrangement is arranged to issue an alert. Thereby, in comparison with an arrangement being adapted to issue an alert in direct response to certain input values, the arrangement is capable of issuing the alert with improved accuracy since a time has elapsed from a detection of an certain combination of the first, the second and the third signal, which gives the arrangement the opportunity to cancel any issuance of the alert in case the first, the second and the third signal changes before the time has elapsed. Thereby, the risk of issuing an alert when it is not necessary is reduced.

According to some embodiments, the vehicle driver assist arrangement is arranged to cancel the alert in case the assessed level of vehicle driver attentiveness is above the predetermined threshold attentiveness level and/or in case the attentiveness level value assumes a value being in-between the first and the second attentiveness level value.

According to some embodiments, the processing unit is arranged to change the attentiveness level value in a direction towards the second attentiveness level value with a first predetermined rate of change in case the following first set of conditions is met;

the first signal indicates an unsafe host vehicle lane position, and the second signal indicates no torque exerted on the steering wheel, and the third signal indicates no pressure exerted on the one or more pedals.

Since the processing unit is arranged to change the attentiveness level value in a direction towards the second attentiveness level value with a first predetermined rate of change in case the first set of conditions is met, and since the vehicle driver assist arrangement is arranged to issue an alert in case the attentiveness level value is at the second attentiveness level value or assumes a value not being in-between the first and the second attentiveness level values and closer to the second attentiveness level value than the first attentiveness level value, the vehicle driver will receive an alert if the first set of conditions is met during a certain time.

According to some embodiments, the processing unit is arranged to change the attentiveness level value in a direction towards the second attentiveness level value with a second predetermined rate of change in case the following second set of conditions is met;

the first signal indicates an unsafe host vehicle lane position, and the second signal indicates no torque exerted on the steering wheel, and the third signal indicates a pressure exerted on the one or more pedals, the second predetermined rate of change being lower than the first predetermined rate of change.

The first set of conditions indicates the presence of a more severe situation than the second set of conditions, since the third signal indicates a pressure exerted on the one or more pedals in the second set of conditions. A vehicle driver may receive an alert later in case the second set of conditions is met as compared to a situation where the first set of conditions is met due to the second predetermined rate of change being lower than the first predetermined rate of change. Thereby, the alert may be issued with improved accuracy since a longer time may elapse in the less severe situation before the alert is issued which gives the arrangement a longer time to cancel the issuance of the alert. As previously mentioned, the vehicle driver assist arrangement is arranged to cancel the alert in case the attentiveness level value assumes a value being in-between the first and the second attentiveness level values. As a further result of the above features, the risk of unnecessarily issuing an alert is reduced.

According to some embodiments, the processing unit is arranged to change the attentiveness level value in a direction towards the second attentiveness level value with a third predetermined rate of change in case the following third set of conditions is met;

the first signal indicates an unsafe host vehicle lane position, and the second signal indicates torque exerted on the steering wheel, and the third signal indicates no pressure exerted on the one or more pedals, the third predetermined rate of change being lower than the second predetermined rate of change.

A situation where no torque is exerted on the steering wheel can be considered to be a more severe situation than a situation where no pressure is exerted on the one or more pedals. The third signal indicates a pressure exerted on the one or more pedals in the second set of conditions, and the second signal indicates torque exerted on the steering wheel in the third set of conditions. The other two signals in both the second and the third set of conditions indicate unsafe conditions. Accordingly, the second set of conditions indicates the presence of a more severe situation than the third set of conditions. The vehicle driver may receive an alert later in case the third set of conditions is met as compared to a situation where the second set of conditions is met since the third predetermined rate of change is lower than the second predetermined rate of change. Thereby, the alert may be issued with improved accuracy since a longer time may elapse before the alert is issued in the less severe situation which gives the arrangement a longer time to cancel the issuance of the alert. As a further result, the risk of issuing an unnecessary alert is reduced.

According to some embodiments, the processing unit is arranged to change the attentiveness level value in a direction towards a third attentiveness level value with a fourth predetermined rate of change in case the following fourth set of conditions is met;

the first signal indicates an unsafe host vehicle lane position, and the second signal indicates a torque exerted on the steering wheel, and the third signal indicates a pressure exerted on the one or more pedals, where the processing unit is arranged to change the attentiveness level value in a direction towards the third attentiveness level value with a fifth predetermined rate of change in case the following fifth set of conditions is met;

the first signal indicates safe host vehicle lane position, and the second signal indicates no torque exerted on the steering wheel, and the third signal indicates no pressure exerted on the one or more pedals, the third attentiveness level value being a value in-between the first and the second attentiveness level value.

Both the fourth and the fifth set of conditions may be regarded as less severe situations than the first, the second or the third set of conditions since the second signal indicates a torque exerted on the steering wheel, and the third signal indicates a pressure exerted on the one or more pedals in the fourth set of conditions, and the first signal indicates a safe host vehicle lane position in the fifth set of conditions. Since the third attentiveness level value is a value in-between the first and the second attentiveness level value and since the processing unit is arranged to change the attentiveness level value in a direction towards the third attentiveness level value in case the fourth or fifth set of conditions is met, the second attentiveness value will not be reached while the fourth or fifth set of conditions is met. Thus, the alert will not be issued while the fourth or fifth set of conditions is met. However, since the third attentiveness level value is a value in-between the first and the second attentiveness level value and the processing unit is arranged to change the attentiveness level value towards this value in case the fourth or the fifth set of conditions is met, a time to which the alert is issued may be reduced if any of the first, the second or the third conditions are met after the fourth or fifth set of conditions have been met. Thus, when transitioning from a modestly severe condition to a severe condition, time to alert may be reduced as compared to a situation where the condition transitions from a safe condition to a severe condition. Thereby, the alert may be issued in a more reliable manner, the risk of issuing an alert when it is not necessary is reduced, and the ability of the arrangement to detect sudden inattention of a vehicle driver is further improved.

According to some embodiments, the processing unit is arranged to change the attentiveness level value in a direction towards the first attentiveness level value with a sixth predetermined rate of change in case the following sixth set of conditions is met;

the first signal indicates a safe host vehicle lane position, and the second signal indicates no torque exerted on the steering wheel, and the third signal indicates pressure exerted on the one or more pedals.

The sixth set of conditions can be considered less severe than the first, the second, the third, the fourth and the fifth set of conditions since only the second signal indicates a severe condition in the sixth set of conditions. The processing unit is arranged to change the attentiveness level value in a direction towards the first attentiveness level value with a sixth predetermined rate of change in case the sixth set of conditions is met. Therefore, the attentiveness level value will not reach the second attentiveness value while the sixth sets of conditions is met and the alert will not be issued while the sixth sets of conditions is met. Instead, the processing unit will change attentiveness level value in a direction towards the first attentiveness level value, i.e. a value corresponding to a state where the vehicle driver is considered to be fully attentive. Therefore, an arrangement is provided capable of issuing an alert in a reliable manner and where the risk of unnecessarily issuing the alert is reduced.

According to some embodiments, the processing unit is arranged to change the attentiveness level value in a direction towards the first attentiveness level value with a seventh predetermined rate of change in case the following seventh set of conditions is met;

the first signal indicates a safe host vehicle lane position, and the second signal indicates torque exerted on the steering wheel, and the third signal indicates no pressure exerted on the one or more pedals, the seventh predetermined rate of change being higher than the sixth predetermined rate of change.

A condition where no torque is exerted on the steering wheel can be considered to be more severe than a condition where no pressure is exerted on the one or more pedals. Therefore, the seventh set of conditions can be considered less severe than the sixth set of conditions since only the third signal indicates no pressure exerted on the one or more pedals in the seventh set of conditions. The processing unit is arranged to change the attentiveness level value in a direction towards the first attentiveness level value with a seventh predetermined rate of change in case the seventh set of conditions is met where seventh predetermined rate of change is higher than the sixth predetermined rate of change. Therefore, the attentiveness level value will be changed towards the first attentiveness level value, i.e. towards a value where the driver is assumed to be fully attentive, with a higher rate of change with respect to time in case the seventh set of conditions is met than in case sixth set of conditions is met. Therefore, an arrangement is provided capable of issuing an alert in a reliable manner and where the risk of unnecessarily issuing the alert is reduced.

According to some embodiments, the processing unit is arranged to change the attentiveness level value in a direction towards the first attentiveness level value with a eighth predetermined rate of change in case the following eighth set of conditions is met;

the first signal indicates a safe host vehicle lane position, and the second signal indicates torque exerted on the steering wheel, and the third signal indicates pressure exerted on the one or more pedals, the eight predetermined rate of change being higher than the seventh predetermined rate of change.

In the eighth set of conditions, each of the first, the second and the third signal indicates a safe condition. Therefore, the eighth set of conditions can be considered less severe than all the herein previous described sets of conditions and thus also less severe than the seventh set of conditions. The processing unit is arranged to change the attentiveness level value in a direction towards the first attentiveness level value with a eighth predetermined rate of change in case the eighth set of conditions is met where the eighth predetermined rate of change is higher than the seventh predetermined rate of change. Therefore, the attentiveness level value will be changed towards the first attentiveness level value, i.e. towards a value where the driver is assumed to be fully attentive, with a higher rate of change with respect to time in case the eighth set of conditions is met than in case seventh set of conditions is met. Therefore, an arrangement is provided capable of issuing an alert in a reliable manner and where the risk of unnecessarily issuing the alert is reduced.

According to some embodiments, the vehicle driver attentiveness assessment arrangement further comprises a vehicle driver gaze direction monitoring unit which is arranged to detect a vehicle driver gaze direction and to transmit a fourth signal indicative of vehicle driver gaze direction to the processing unit, where the processing unit is arranged to further assess the level of vehicle driver attentiveness on the basis of the fourth signal. In such embodiments, the alert may be issued in an even more reliable manner since the processing unit also is arranged to assess the level of vehicle driver attentiveness on the basis of the fourth signal.

According to some embodiments, the vehicle driver assist arrangement is arranged to continue to issue the alert while the assessed level of vehicle driver attentiveness is below the predetermined threshold attentiveness level, and where the issue of the alert involves a series of actions comprising at least a first and a second action where the second action is arranged to be more intrusive to a vehicle driver than the first action and where the second action is arranged to be initiated a predetermined time after the first action. Thereby, a vehicle driver of a vehicle hosting the arrangement will be subjected to a series of actions each being increasingly intrusive while the assessed level of vehicle driver attentiveness is below the predetermined threshold attentiveness level. As a result, overall vehicle driving safety is improved since the ability of the arrangement to call for a vehicle driver's attention is further improved.

According to some embodiments, the vehicle driver attentiveness assessment arrangement further comprises a vehicle driver gaze direction monitoring unit which is arranged to transmit a fourth signal indicative of vehicle driver gaze direction to the processing unit, where the output unit comprises a display, and where the arrangement is arranged to issue the alert through display of a symbol on the display, and where the predetermined time by which the second action is arranged to be initiated after the first action is reduced in case the fourth signal indicates that a vehicle driver gaze direction is not in a direction towards the symbol displayed. Due to the predetermined time being reduced, a vehicle driver will be subjected to an action being more intrusive in a shorter time. Thereby, vehicle driving safety may be further improved.

According to some embodiments, the vehicle driver assist arrangement further comprises an autonomous vehicle steering system and an autonomous vehicle brake system where the series of actions comprises at least one action comprising an autonomous intervention in the steering of the vehicle by the autonomous vehicle steering system and/or an autonomous stopping of the vehicle by the autonomous vehicle brake system. Due to the autonomous intervention in the steering of the vehicle by the autonomous vehicle steering system and/or an autonomous stopping of the vehicle by the autonomous vehicle brake system, overall vehicle driving safety may be further improved and the risk of a vehicle collision may be further reduced.

According to an aspect of the disclosure, the object is achieved by a method of assisting a vehicle driver using a vehicle driver assist arrangement comprising an output unit and a vehicle driver attentiveness assessment arrangement comprising a host vehicle lane position evaluation unit, a steering wheel torque detection unit, a pedal pressure detecting unit, and a processing unit, where the method comprises detecting and evaluating a host vehicle lane position using the host vehicle lane position evaluation unit, transmitting a first signal indicative of a safe and/or unsafe host vehicle lane position to the processing unit, detecting a torque exerted on the steering wheel of the host vehicle using the steering wheel torque detection unit, transmitting a second signal indicative of the torque exerted on the steering wheel to the processing unit, detecting a pressure exerted on one or more pedals of the host vehicle using the pedal pressure detecting unit, transmitting a third signal indicative of the pedal pressure to the processing unit, assessing a level of vehicle driver attentiveness on the basis of the first, the second and the third signal using the processing unit, and issuing an alert, via the output unit, in case the assessed level of vehicle driver attentiveness is below a predetermined threshold attentiveness level.

Again, since the level of vehicle driver attentiveness is assessed on the basis of the first, the second and the third signal, a vehicle driver assist arrangement is provided with an improved accuracy in the assessment of vehicle driver attentiveness.

As a result, the above mentioned object is achieved.

Also, since the alert is issued in case the assessed level of vehicle driver attentiveness is below a predetermined threshold attentiveness level, overall driving safety is improved.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

The embodiments herein will now be described more fully with reference to the accompanying drawings, in which example embodiments are shown. Disclosed features of example embodiments may be combined as readily understood by one of ordinary skill in the art. Like numbers refer to like elements throughout. Well-known functions or constructions will not necessarily be described in detail for brevity and/or clarity.

Figure 1:
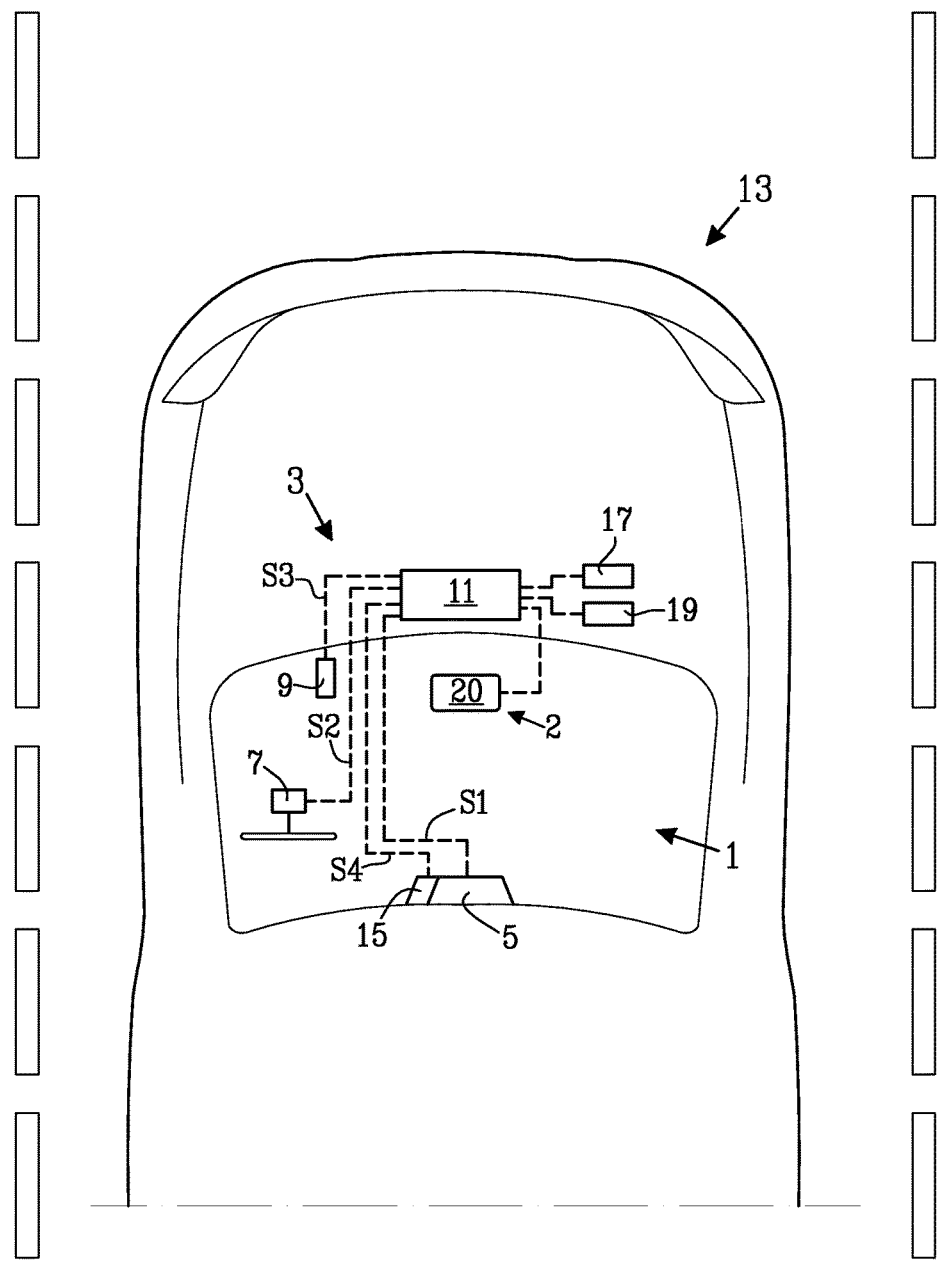
FIG. 1 illustrates a vehicle driver assist arrangement 1, and a vehicle 13 comprising a vehicle driver assist arrangement 1.

FIG. 1 illustrates a vehicle driver assist arrangement 1 comprising an output unit 2 and a vehicle driver attentiveness assessment arrangement 3 comprising a host vehicle lane position evaluation unit 5, a steering wheel torque detection unit 7, a pedal pressure detecting unit 9, and a processing unit 11. The host vehicle lane position evaluation unit 5 is arranged to detect and evaluate a host vehicle lane position and transmit a first signal S1 indicative of a safe and/or unsafe vehicle host vehicle lane position to the processing unit 11. The steering wheel torque detection unit 7 is arranged to detect the torque exerted on the steering wheel of the vehicle 13 hosting the arrangement 1 and to transmit a second signal S2 indicative of the torque exerted on the steering wheel to the processing unit 11. The pedal pressure detecting unit 9 is arranged to detect the pressure exerted on one or more pedals of the vehicle 13 hosting the arrangement 1 and to transmit a third signal S3 indicative of the pedal pressure to the processing unit 11. The processing unit 11 is arranged to assess a level of vehicle driver attentiveness on the basis of the first, the second and the third signal S1, S2, S3. The vehicle driver assist arrangement 1 is arranged to issue an alert, via the output unit 2, in case the assessed level of vehicle driver attentiveness is below a predetermined threshold attentiveness level. Thereby, an alert may be issued with high accuracy.

FIG. 1 also illustrates a vehicle 13 comprising a vehicle driver assist arrangement 1 according to some embodiments.

The host vehicle lane position evaluation unit 5 may comprise a vehicle lane position detecting unit such as a camera and/or a positioning system, such as a GPS forming part of a navigation system and/or a LIDAR (Light Detecting And Ranging) system. The host vehicle lane position evaluation unit 5 may further comprise an evaluation unit, such as a processing unit, memory and computer executable instructions stored therein for performing various functions and/or operations described herein, arranged to evaluate the detected host vehicle lane position of the vehicle 13 hosting the arrangement 1. Thereby, the host vehicle lane position evaluation unit 5 is able to determine if a detected current vehicle lane position constitutes a safe and/or unsafe vehicle lane position. Thereby, the host vehicle lane position evaluation unit 5 is able to transmit a first signal S1 indicative of a safe and/or unsafe vehicle lane position to the processing unit 11. The vehicle lane position may be evaluated on the basis of a current vehicle lane position, one or more historical vehicle lane positions, and/or a rate of change of a current host vehicle lane position.

Further, the host vehicle lane position evaluation unit 5 may be arranged to receive a fifth signal indicative of the use of a vehicle turn signal. In such embodiments, the host vehicle lane position evaluation unit 5 may be arranged to evaluate the vehicle lane position as unsafe when an initiated or on-going vehicle lane change or lane departure is detected in a direction without the fifth signal indicating the use of a vehicle turn signal in that direction. Likewise, in such embodiments, the host vehicle lane position evaluation unit 5 may be arranged to evaluate the host vehicle lane position as safe when an initiated or on-going vehicle lane change or lane departure is detected in a direction and the fifth signal indicates use of a vehicle turn signal in that direction. The host vehicle lane position evaluation unit 5 may form part of a lane keeping system.

The steering wheel torque detection unit 7 may comprise a torque or force detecting unit, which may include a sensor, arranged somewhere between the vehicle steering wheel and the steered wheels of the vehicle being arranged to detect a torque exerted on the steering wheel of the vehicle 13 hosting the arrangement 1. Thereby, the steering wheel torque detection unit 7 is able to transmit a second signal S2 indicative of the torque exerted on the steering wheel to the processing unit 11.

The pedal pressure detecting unit 9 may comprise a pressure or torque detecting unit, which may include a sensor, arranged to detect the pressure exerted on one or more pedals of the vehicle 13 hosting the arrangement 1. Thereby, the pedal pressure detecting unit 9 is able to transmit a third signal S3 indicative of the pedal pressure to the processing unit 11.

The steering wheel torque detection unit 7 and/or the pedal pressure detecting unit 9 may be arranged to detect a magnitude of a torque, force or a pressure, and/or may be arranged to detect the presence of a torque, force or pressure.

The processing unit 11 may comprise one or more processors being arranged to assess a level of vehicle driver attentiveness on the basis of the first, the second, and the third signal S1, S2, S3. The processing unit 11 may further comprise one or more memories arranged to communicate with the one or more processors, as well as computer executable instructions stored in the one or more memories for performing various functions and/or operations described herein.

The output unit 2 may comprise a display, a head up display, a speaker, a haptic feedback arrangement, a Driver Information Module (DIM), Forward Collision Warning (FCW) lights, and/or an autonomous pulse braking unit.

The processing unit 11 may be arranged to determine a value V representative of the level of vehicle driver attentiveness, where the attentiveness level value V is within a range between a first attentiveness level value V1 corresponding to an attentiveness level in which the driver is assumed to be fully attentive and a second attentiveness level value V2 corresponding to an attentiveness level in which the driver is assumed to be inattentive. The second attentiveness level value V2 corresponds to the predetermined threshold attentiveness level. The processing unit 11 is arranged to change the attentiveness level value V with a predetermined rate of change R1, R2, R3, R4, R5, R6, R7, R8 with respect to time on the basis of the first, the second and the third signal S1, S2, S3. Since, the second attentiveness level value V2 corresponds to the predetermined threshold attentiveness level, the vehicle driver assist arrangement 1 is arranged to issue an alert, via the output unit 2 in case the attentiveness level value V assumes the second attentiveness level V2 or a value not being in-between the first and the second attentiveness level values V1, V2 and closer to the second attentiveness level value V2 than the first attentiveness level value V1. That is, in embodiments where a scale is used such that the first attentiveness level value V1 is a value being higher than the second attentiveness level value V2, the vehicle driver assist arrangement 1 may be arranged to issue an alert, via the output unit 2 in case the attentiveness level value V assumes a value lower than the second attentiveness level value V2, and in embodiments where a scale is used such that the first attentiveness level value V1 is a value being lower than the second attentiveness level value V2, the vehicle driver assist arrangement 1 may be arranged to issue an alert, via the output unit 2 in case the attentiveness level value V assumes a value being higher than the second attentiveness level V2. Thus, in response to a combination of the first, the second and the third signal S1, S2, S3, the arrangement 1 will issue the alert.

According to some embodiments, the vehicle driver assist arrangement 1 is arranged to cancel the alert in case the assessed level of vehicle driver attentiveness is above the predetermined threshold attentiveness level and/or in case the attentiveness level value V assumes a value being in-between the first and the second attentiveness level values V1, V2.

Figures 2, 3:
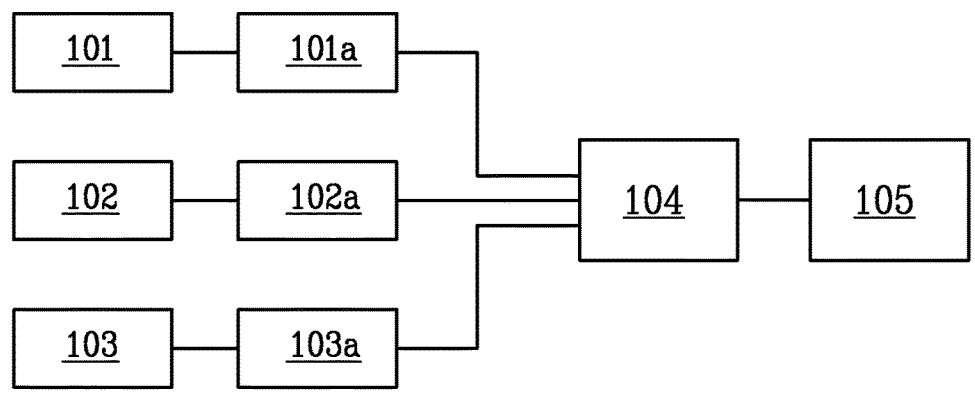
FIG. 2 Illustrates a table illustrating the set of conditions C1-C8.
FIG. 3 illustrates a method of assisting a vehicle driver.

FIG. 2 Illustrates a table illustrating the set of conditions C1-C8, where the first signal S1 is indicative of a safe and/or unsafe host vehicle lane position the second signal S2 is indicative of the torque exerted on the steering wheel the third signal S3 is indicative of the pedal pressure. A black box in the table illustrated in FIG. 2 indicates an unsafe condition and a white box indicates a safe condition. That is, a black box in the first signal S1 column indicates an unsafe host vehicle lane position and a white box in the first signal S1 column indicates a safe host vehicle lane position. Further, a black box in the second signal S2 column indicates no torque exerted on the steering wheel and a white box in the second signal S2 column indicates a torque exerted on the steering wheel. Likewise, a black box in the third signal S3 column indicates that no pressure is exerted on the one or more pedals and a white box in the third signal S3 column indicates a pressure is exerted on the one or more pedals.

As illustrated in FIG. 2, the first set of conditions C1 corresponds to a situation where the first signal S1 indicates an unsafe host vehicle lane position, and the second signal S2 indicates no torque exerted on the steering wheel, and the third signal S3 indicates no pressure exerted on the one or more pedals.

The second set of conditions C2 corresponds to a situation where the first signal S1 indicates an unsafe host vehicle lane position, and the second signal S2 indicates no torque exerted on the steering wheel, and the third signal S3 indicates a pressure exerted on the one or more pedals, The third set of conditions C3 corresponds to a situation where the first signal S1 indicates an unsafe host vehicle lane position, and the second signal S2 indicates torque exerted on the steering wheel, and the third signal S3 indicates no pressure exerted on the one or more pedals, The fourth set of conditions C4 corresponds to a situation where the first signal S1 indicates an unsafe host vehicle lane position, and the second signal S2 indicates a torque exerted on the steering wheel, and the third signal S3 indicates a pressure exerted on the one or more pedals, The fifth set of conditions C5 corresponds to a situation where the first signal S1 indicates safe host vehicle lane position, and the second signal S2 indicates no torque exerted on the steering wheel, and the third signal S3 indicates no pressure exerted on the one or more pedals.

The sixth set of conditions C6 corresponds to a situation where the first signal S1 indicates a safe host vehicle lane position, and the second signal S2 indicates no torque exerted on the steering wheel, and the third signal S3 indicates pressure exerted on the one or more pedals.

The seventh set of conditions C7 corresponds to a situation where the first signal S1 indicates a safe host vehicle lane position, and the second signal S2 indicates torque exerted on the steering wheel, and the third signal S3 indicates no pressure exerted on the one or more pedals, The eighth set of conditions C8 corresponds to a situation where the first signal S1 indicates a safe host vehicle lane position, and the second signal S2 indicates torque exerted on the steering wheel, and the third signal S3 indicates pressure exerted on the one or more pedals, Hence, according to some embodiments, the processing unit 11 is arranged to change the attentiveness level value V in a direction towards the second attentiveness level value V2 with a first predetermined rate of change R1 in case the first set of conditions C1 is met, and a direction towards the second attentiveness level value V2 with a second predetermined rate of change R2 in case the second set of conditions C2 is met. The difference between the first set of conditions C1 and the second set of conditions C2 is that the third signal S3 indicates a pressure exerted on the one or more pedals in the second set of conditions C2, as compared to the first set of conditions C1 where the third signal S3 indicates no pressure exerted on the one or more pedals. Accordingly, the first set of conditions C1 indicates the presence of a more severe situation than the second set of conditions C2. The second predetermined rate of change R2 is lower than the first predetermined rate of change R1. Thereby, the attentiveness level value V will reach the second attentiveness level value V2 in a shorter time in case the first set of conditions C1 is met as compared to the case where the second set of conditions C2 is met.

Thereby, an arrangement 1 is provided where the time to which an alert will be issued is adapted to a severeness of a situation. Thereby, the alert may be issued with improved accuracy since a longer time elapses in the less severe situation before the alert is issued which gives the arrangement 1 a longer time to cancel the issuing of the alert. As a further result, the risk of issuing an alert when it is not necessary is reduced According to some embodiments, the processing unit 11 is arranged to change the attentiveness level value in a direction towards the second attentiveness level value V2 with a third predetermined rate of change R3 in case the third set of conditions C3 is met. The third signal S3 indicates a pressure exerted on the one or more pedals in the second set of conditions C2, and the second signal S2 indicates torque exerted on the steering wheel in the third set of conditions C3. The other two signals in both the second and the third set of conditions C2 and C3 indicate unsafe conditions. No torque exerted on the steering wheel can be considered to be a more severe situation than a situation where no pressure is exerted on the one or more pedals.

Accordingly, the second set of conditions C2 indicates the presence of a more severe situation than the third set of conditions C3. The third predetermined rate of change R3 is lower than the second predetermined rate of change R2. Thereby, the attentiveness level value V will reach the second attentiveness level value V2 in a shorter time in case the second set of conditions C2 is met as compared to the case where the third set of conditions C3 is met. Thereby, an arrangement 1 is provided where the time to which an alert will be issued is adapted to a severeness of a situation. Thereby, the alert may be issued with improved accuracy since more time elapses in the less severe situation before the alert is issued which gives the arrangement 1 more time to cancel issuance of the alert. As a further result, the risk of unnecessarily issuing an alert is reduced.

The first predetermined rate of change R1 may correspond to a rate of change where the attentiveness level value V is changed from the first attentiveness level value V1 to the second attentiveness level value V2 in approximately 1 second.

The second predetermined rate of change R2 may correspond to a rate of change where the attentiveness level value V is changed from the first attentiveness level value V1 to the second attentiveness level value V2 in approximately 3 seconds.

The third predetermined rate of change R3 may correspond to a rate of change where the attentiveness level value V is changed from the first attentiveness level value V1 the second attentiveness level value V2 in approximately 5 seconds.

In such embodiments, the vehicle driver assist arrangement will issue an alert after 1 second in cases where attentiveness level value V is at the first attentiveness level value V1 and the first set of conditions C1 is met, and after 3 second in cases where attentiveness level value V is at the first attentiveness level value V1 and the second set of conditions C2 is met, and after 5 second in cases where attentiveness level value V is at the first attentiveness level value V1 and the third set of conditions C3 is met.

The instance at which the arrangement 1 issues the alert, when a set of conditions is met, is dependent upon a "start value" of attentiveness level value V. Accordingly, the instance at which the arrangement 1 issues the alert is dependent upon a previous combination or combinations of the first, the second and the third signals S1, S2, S3 and also dependent upon the time at which such a combination or combinations have been met. Thereby, the instance at which the arrangement 1 issues the alert when a certain set of conditions is met is dependent upon a previous situation. Thereby, a more reliable issuing of the alert may be performed.

For example, if the attentiveness level value V is at a value midway between the first attentiveness level value V1 and the second attentiveness level value V2, the vehicle driver assist arrangement 1 will issue an alert after 0.5 second in case the first set of conditions C1 is met, or after 1.5 second in case the second set of conditions C2 is met, or after 2.5 seconds in case the third set of conditions C3 is met.

The first, the second and/or the third predetermined rate of change R1, R2 and/or R3 may further be dependent upon a velocity of the vehicle 13 hosting the arrangement 1 in a manner such that the first, the second and/or the third predetermined rate of change R1, R2 and/or R3 increases with increased host vehicle velocity. In such embodiments, the arrangement 1 will issue the alert earlier in case the vehicle velocity is high as compared to a situation where the vehicle velocity is low. Thereby, overall vehicle safety will be improved since a driver has a shorter time to react in a high speed situation than in a low speed situation and thus in these embodiments will receive the alert earlier in case of a higher velocity.

According to some embodiments, the processing unit 11 is arranged to change the attentiveness level value V in a direction towards a third attentiveness level value V3 with a fourth predetermined rate of change R4 in case the fourth set of conditions C4 is met. Further, the processing unit 11 may be arranged to change the attentiveness level value in a direction towards the third attentiveness level value V3 with a fifth predetermined rate of change R5 in case the fifth set of conditions C5 is met. The third attentiveness level value V3 is a value in-between the first and the second attentiveness level value V1, V2. Since the third attentiveness level value V3 is a value in-between the first and the second attentiveness level value V1, V2 and since the processing unit 11 is arranged to change the attentiveness level value V3 in a direction towards the third attentiveness level value V3 in case the fourth or fifth set of conditions C4, C5 are met, the second attentiveness level value V2 will not be reached as long as the fourth or fifth set of conditions C4, C5 are met. Thus, the alert will not be issued as long as the fourth or fifth sets of conditions C4, C5 are met.

Although the first signal S1 indicates an unsafe host vehicle lane position, in the fourth set of conditions C4, the second signal S2 indicates a torque exerted on the steering wheel, and the third signal S3 indicates a pressure exerted on the one or more pedals. The vehicle driver can be considered to be in control of the vehicle but the host vehicle lane position is indicated to be unsafe in the in the fourth set of conditions C4. Due to the processing unit 11 being arranged to change the attentiveness level value V in a direction towards the third attentiveness level value V3 with a fourth predetermined rate of change R4 in case the fourth set of conditions C4 is met, the vehicle driver will not receive the alert while the fourth set of conditions C4 is met. However, the time to alert will be reduced if any of the first, the second or the third set of conditions C1-C3 are met since the third attentiveness level value V3 is a value in-between the first and the second attentiveness level values V1, V2. Thereby, the alert is issued with improved accuracy since the driver will not receive the alert as long as the driver is considered to be in control of the vehicle 13 but is alerted earlier if a more severe set of conditions is met.

Likewise, even though the first signal S1 indicates a safe host vehicle lane position in the fifth set of conditions C5, the second signal S2 indicates no torque exerted on the steering wheel and the third signal S3 indicates no pressure exerted on the one or more pedals. Therefore, the host vehicle lane position can be considered to be safe, but it is uncertain whether the driver has control of the vehicle 13. Due to the processing unit 11 being arranged to change the attentiveness level value V in a direction towards the third attentiveness level value V3 with a fifth predetermined rate of change R5 in case the fifth set of conditions C5 is met, the vehicle driver will not receive the alert as long as the fourth set of conditions C5 is met, but the time to alert will be reduced if any of the first, the second or the third set of conditions C1-C3 is met. Thereby, the alert is issued with improved accuracy since the driver will not receive the alert as long as the first signal S1 indicates a safe host vehicle lane position but is alerted earlier if a more severe set of conditions is met.

According to some embodiments, the third attentiveness level value V3 is a value midway in-between the first and the second attentiveness level values V1, V2. Further, both the fourth predetermined rate of change R4 and the fifth predetermined rate of change R5 may correspond to a rate of change where the attentiveness level value V is changed from the first attentiveness level value V1 to the second attentiveness level value V2 in 5 seconds or from the second attentiveness level value V2 to the first attentiveness level value V1 in 5 seconds. In embodiments where the third attentiveness level value V3 is a value midway in-between the first and the second attentiveness level value V1, V2, such rate of change corresponds to a rate of change where the attentiveness level value V is changed from the first attentiveness level value V1 to the third attentiveness level value V3 or from the second attentiveness level value V2 to the third attentiveness level value V3 in 2.5 seconds.

According to some embodiments, the processing unit 11 is arranged to change the attentiveness level value V in a direction towards the first attentiveness level value V1 with a sixth predetermined rate of change R6 in case the sixth set of conditions C6 is met and in a direction towards the first attentiveness level value V1 with a seventh predetermined rate of change R7 in case the seventh set of conditions C7 is met. The seventh predetermined rate of change R7 is higher than the sixth predetermined rate of change R6.

The difference between the sixth set of conditions C6 and the seventh set of conditions C7 is that the second signal S2 indicates no torque exerted on the steering wheel in the sixth set of conditions C6, whereas the third signal S3 indicates no pressure exerted on the one or more pedals in the seventh set of conditions C7. The remaining signals in the sixth and seventh set of conditions C6 and C7 indicates safe conditions. A condition where no torque is exerted on the steering wheel can be considered to be more severe than a condition where no pressure is exerted on the one or more pedals. However, both the sixth and seventh set of conditions C6 and C7 are considered less severe than the first, the second, the third, the fourth and the fifth condition C1-C5 since the remaining signals in the sixth and seventh set of conditions C6 and C7 indicates safe conditions. Therefore, the processing unit 11 is arranged to change the attentiveness level value V in a direction towards the first attentiveness level value V1, i.e. towards a value where the driver is assumed to be fully attentive, if any of the sixth and seventh set of conditions C6 or C7 is met. The seventh predetermined rate of change R7 is higher than the sixth predetermined rate of change R6, since a condition where no torque is exerted on the steering wheel is considered to be more severe than a condition where no pressure is exerted on the one or more pedals. Therefore, the attentiveness level value V will be changed towards the first attentiveness level value V1, i.e. towards a value where the driver is assumed to be fully attentive, with a higher rate of change with respect to time in case the seventh set of conditions C7 is met than in case sixth set of conditions is met C6. Therefore, an arrangement 1 is provided capable of issuing an alert in a reliable manner and where the risk of unnecessarily issuing the alert is reduced.

According to some embodiments, the processing unit 11 is arranged to change the attentiveness level value V in a direction towards the first attentiveness level value V1 with a eighth predetermined rate of change R8 in case the eighth set of conditions C8 is met. In the eighth set of conditions C8 each one of the first, the second and the third signal S1-S3 indicates safe conditions. Therefore, the eighth set of conditions C8 can be considered less severe than all the previously described sets of conditions C1, C2, C3, C4, C5, C6, and C7 and thus also less severe than the seventh set of conditions C7. The processing unit 11 is arranged to change the attentiveness level value V in a direction towards the first attentiveness level value V1 with a eighth predetermined rate of change R8 in case the eighth set of conditions C8 is met where the eighth predetermined rate of change R8 is higher than the seventh predetermined rate of change R7. Therefore, the attentiveness level value V will be changed towards the first attentiveness level value V1, i.e. towards a value where the driver is assumed to be fully attentive, with a higher rate of change with respect to time in case the eighth set of conditions C8 is met than in case seventh set of conditions C7 is met. Therefore, an arrangement 1 is provided capable of issuing an alert in a reliable manner and where the risk of issuing the alert when it is not necessary is reduced.

The sixth predetermined rate of change R6 may correspond to a rate of change where the attentiveness level value V is changed from the second attentiveness level value V2 to the first attentiveness level value V1 in approximately 5 seconds.

The seventh predetermined rate of change R7 may correspond to a rate of change where the attentiveness level value V is changed from the second attentiveness level value V2 to the first attentiveness level value V1 in approximately 3 seconds.

The eighth predetermined rate of change R8 may correspond to a rate of change where the attentiveness level value V is changed from the second attentiveness level value V2 to the first attentiveness level value V1 in approximately 1 second.

Due to the processing unit 11 being arranged to change the attentiveness level value in a direction towards the first attentiveness level value V1 in case any of the sixth, seventh or eighth set of conditions C6-C8 is met, a reliable and situation based issuing of the alert can be performed. That is, the attentiveness level value is changed with a higher rate towards the first attentiveness level value V1 in case the conditions are considered safe. Due to these features, an arrangement is provided capable a reliable issuing the alert, where the alert not will be issued when it is not necessary and where the question of whether to alert the driver not only depends of the set of conditions met, but also if previously sets of conditions have been met and a time by which these conditions have been met.

The column A in the table illustrated in FIG. 2 illustrates the action A the processing unit 11 is arranged to perform in response to the set of conditions met, where "V→V2, R1" is intended to illustrate the action where the attentiveness level value V is changed towards the second attentiveness level value V2 with the first predetermined rate of change R1, and where "V→V2, R2" is intended to illustrate the action where the attentiveness level value V is changed towards the second attentiveness level value V2 with the second predetermined rate of change R2, etc.

According to some embodiments, the vehicle driver attentiveness assessment arrangement 3 further comprises a vehicle driver gaze direction monitoring unit 15 which is arranged to detect a vehicle driver gaze direction and to transmit a fourth signal S4 indicative of vehicle driver gaze direction to the processing unit 11, where the processing unit 11 is arranged to further assess the level of vehicle driver attentiveness on the basis of the fourth signal. The processing unit 11 may be arranged to change the attentiveness level value V in a direction towards the second attentiveness value V2 in case the fourth signal S4 indicates an unsafe vehicle driver gaze direction, and to change the attentiveness level value V in a direction towards the first attentiveness level value V1 in case the fourth signal S4 indicates an safe vehicle driver gaze direction. Also, the processing unit 11 may be arranged to change the attentiveness level value V towards the first or the second or the third attentiveness level value V1, V2, V3 in dependence of a combination of the first, the second, the third, and the fourth signals S1, S2, S3, S4. In such embodiments, improved issuance of the alert may be performed since also the fourth signal is taken into account in the calculation of the attentiveness level value V.

According to some embodiments, the vehicle driver assist arrangement 1 may be arranged to continue to issue the alert while the assessed level of vehicle driver attentiveness is below the predetermined threshold attentiveness level. That is, according to some embodiments, the vehicle driver assist arrangement 1 is arranged to issue the alert while the attentiveness level value V is at the second attentiveness level value V2 or at a value not being in-between the first and the second attentiveness level values V1, V2 and closer to the second attentiveness level value V2 than the first attentiveness level value V1. Further, issuance of the alert may involve a series of actions comprising at least a first and a second action where the second action is arranged to be more intrusive to a vehicle driver than the first action and where the second action is arranged to be initiated a predetermined time after the first action. Thereby, a vehicle driver of a vehicle hosting the arrangement will be subjected to a series of actions each being increasingly intrusive while the assessed level of vehicle driver attentiveness is below the predetermined threshold attentiveness level. As a result, overall vehicle driving safety is improved.

The first and/or the second action may for example be displaying of a symbol, playing of a sound, displaying a control question to the driver in a Driver Information Module (DIM), flashing of Forward Collision Warning (FCW) lights, a haptic feedback in the steering wheel or in the seat, an autonomous pulse braking, an autonomous intervention in the steering of the vehicle 13 and an autonomous stopping of the vehicle 13.

The actions above are given in the order in which they are considered increasingly intrusive. That is, an autonomous stopping of the vehicle 13 is considered to be the most intrusive action to a vehicle driver, and the displaying of a symbol the least intrusive action to a vehicle driver and a haptic feedback in the steering wheel or in the seat is considered less intrusive to a vehicle driver than autonomous pulse braking etc. By issuance of the alert involving a series of such actions comprising at least a first and a second action where the second action is arranged to be more intrusive to a vehicle driver than the first action and where the second action is arranged to be initiated a predetermined time after the first action and the vehicle driver assist arrangement 1 is arranged to continue to issue the alert while the assessed level of vehicle driver attentiveness is below the predetermined threshold attentiveness level, a vehicle driver will be subjected to actions being increasingly intrusive as long as no normal driving behaviour is recognised via the first, the second and the third signals S1-S3.

According to some embodiments, the vehicle driver attentiveness assessment arrangement 3 further comprises a vehicle driver gaze direction monitoring unit 15 which is arranged to transmit a fourth signal S4 indicative of vehicle driver gaze direction to the processing unit 11, where the output unit 2 comprises a display 20, and where the arrangement 1 is arranged to issue the alert through display of a symbol on the display 20, and where the predetermined time by which the second action is arranged to be initiated after the first action is reduced in case the fourth signal S4 indicates that a vehicle driver gaze direction is not in a direction towards the symbol displayed.

That is, if it is not recognized that the vehicle driver gaze direction is in a direction towards the symbol displayed, the assumption is made that the vehicle driver is not attentive and may have fainted or lost consciousness. Due to the predetermined time being reduced, a vehicle driver will be subjected to an action being more intrusive earlier. Thereby, vehicle driving safety may be further improved.

In addition, according to some embodiments, the predetermined time may be dependent on a host vehicle velocity such that the predetermined time is lower in case of a high host vehicle velocity as compared to a low host vehicle velocity. In such embodiments, overall driving safety may be further improved since a vehicle driver will be subjected to an action being more intrusive in a shorter time in case of a high host vehicle velocity as compared to a low host vehicle velocity.

According to some embodiments, the vehicle driver assist arrangement 1 comprises an autonomous vehicle steering system 17 and/or an autonomous vehicle brake system 19 where the series of actions comprises at least one action comprising an autonomous intervention in the steering of the vehicle 13 by the autonomous vehicle steering system 17 and/or an autonomous stopping of the vehicle 13 by the autonomous vehicle brake system 19. Such an autonomous vehicle steering system 17 and an autonomous vehicle brake system 19 have the ability of interfere in the steering or braking of the vehicle 13 on the basis of input from different sensors. The autonomous vehicle steering system 17 may form part of a vehicle lane keeping system and the autonomous vehicle brake system 19 may form part of an automatic brake system. In such embodiments, the driver assist arrangement 1 may be able to steer the host vehicle 13 such that it does not leave a current lane using autonomous vehicle steering system 17 and may autonomously brake the host vehicle to a standstill in a safe manner using the autonomous vehicle brake system 19.

These actions will be performed while the assessed level of vehicle driver attentiveness is below the predetermined threshold attentiveness level and/or while the attentiveness level value V is at the second attentiveness level value V2 or at a value not being in-between the first and the second attentiveness level values V1, V2 and closer to the second attentiveness level value V2 than the first attentiveness level value V1. Accordingly, the actions will be performed while no normal driving behaviour is recognised via the first, the second and the third signals S1-S3. Thereby, vehicle driving safety may be further improved.

According to some embodiments, the vehicle driver assist arrangement 1 further comprises a communication unit being arranged to be able to communicate with a health/rescue organization where the series of actions further comprises a call for emergency assistance to the health/rescue organization.

FIG. 3 illustrates a method of assisting a vehicle driver using a vehicle driver assist arrangement 1 comprising an output unit 2 and a vehicle driver attentiveness assessment arrangement 3 comprising a host vehicle lane position evaluation unit 5, a steering wheel torque detection unit 7, a pedal pressure detecting unit 9, and a processing unit 11, where the method comprises detecting and evaluating 101 a host vehicle lane position using the host vehicle lane position evaluation unit 5, and transmitting 101a a first signal S1 indicative of a safe and/or unsafe host vehicle lane position to the processing unit 11, and detecting 102 a torque exerted on the steering wheel of the host vehicle 13 using the steering wheel torque detection unit 7, and transmitting 102a a second signal S2 indicative of the torque exerted on the steering wheel to the processing unit 11, and detecting 103 a pressure exerted on one or more pedals of the host vehicle 13 using the pedal pressure detecting unit 9, and transmitting 103a a third signal S3 indicative of the pedal pressure to the processing unit 11, and assessing 104 a level of vehicle driver attentiveness on the basis of the first, the second and the third signal S1, S2, S3 using the processing unit 11, and issuing 105 an alert, via the output unit 2, in case the assessed level of vehicle driver attentiveness is below a predetermined threshold attentiveness level.

According to some embodiments, the method further comprises determining a value V representative of the level of vehicle driver attentiveness, using the processing unit 11, where the attentiveness level value V is within a range between a first attentiveness level value V1 corresponding to an attentiveness level in which the driver is assumed to be fully attentive and a second attentiveness level value V2 corresponding to an attentiveness level in which the driver is assumed to be inattentive, the second attentiveness level value V2 corresponding to the predetermined threshold attentiveness level, and changing the attentiveness level value V with a predetermined rate of change R1, R2, R3, R4, R5, R6, R7, R8 on the basis of the first, the second and the third signal S1, S2, S3, using the processing unit 11.

The expression "rate of change" is intended to encompass a rate of change with respect to time.

It is to be understood that the foregoing is illustrative of various example embodiments and the disclosure is not to be limited to the specific embodiments disclosed and that modifications to the disclosed embodiments, combinations of features of disclosed embodiments as well as other embodiments are intended to be included within the scope of the appended claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle driver assist arrangement for a host vehicle, the arrangement comprising:
    an output unit; and
    a vehicle driver attentiveness assessment arrangement comprising a host vehicle lane position evaluation unit, a steering wheel torque detection unit, a pedal pressure detecting unit, and a processing unit;
    wherein the host vehicle lane position evaluation unit is configured to evaluate a host vehicle lane position and transmit a first signal indicative of a safe and/or unsafe host vehicle lane position to the processing unit, the steering wheel torque detection unit is configured to detect a torque exerted on the steering wheel of the host vehicle and to transmit a second signal indicative of the torque exerted on the steering wheel to the processing unit, the pedal pressure detecting unit is configured to detect a pressure exerted on a pedal of the host vehicle and to transmit a third signal indicative of the pedal pressure to the processing unit, the processing unit is configured to assess a level of vehicle driver attentiveness on the basis of the first, the second and the third signals, and the output unit is configured to issue an alert in case the assessed level of vehicle driver attentiveness is below a predetermined threshold attentiveness level; and wherein the processing unit is configured to determine a value representative of the level of vehicle driver attentiveness, where the attentiveness level value is within a range between a first attentiveness level value corresponding to an attentiveness level in which the driver is assumed to be fully attentive and a second attentiveness level value corresponding to an attentiveness level in which the driver is assumed to be inattentive, the second attentiveness level value corresponding to the predetermined threshold attentiveness level, and the processing unit is configured to change the attentiveness level value with a predetermined rate of change on the basis of the first, the second and the third signal.

2. The vehicle driver assist arrangement according to claim 1 wherein the processing unit is configured to change the attentiveness level value in a direction towards the second attentiveness level value with a first predetermined rate of change in case the following first set of conditions is met,
the first signal indicates an unsafe host vehicle lane position,
the second signal indicates no torque exerted on the steering wheel, and
the third signal indicates no pressure exerted on the one or more pedals.

3. The vehicle driver assist arrangement according to claim 1 wherein the processing unit is configured to change the attentiveness level value in a direction towards the second attentiveness level value with a second predetermined rate of change in case the following second set of conditions is met,
the first signal indicates an unsafe host vehicle lane position,
the second signal indicates no torque exerted on the steering wheel,
the third signal indicates a pressure exerted on the one or more pedals;
wherein the second predetermined rate of change is lower than the first predetermined rate of change.

4. The vehicle driver assist arrangement according to claim 1 wherein the processing unit is configured to change the attentiveness level value in a direction towards the second attentiveness level value with a third predetermined rate of change in case the following third set of conditions is met,
the first signal (S1) indicates an unsafe host vehicle lane position,
the second signal (S2) indicates torque exerted on the steering wheel, and
the third signal (S3) indicates no pressure exerted on the one or more pedals;
wherein the third predetermined rate of change is lower than the second predetermined rate of change.

5. The vehicle driver assist arrangement according to claim 1 wherein the processing unit is configured to change the attentiveness level value in a direction towards a third attentiveness level value with a fourth predetermined rate of change in case the following fourth set of conditions is met,
the first signal indicates an unsafe host vehicle lane position,
the second signal indicates a torque exerted on the steering wheel, and
the third signal indicates a pressure exerted on the one or more pedals;
wherein the processing unit is further configured to change the attentiveness level value in a direction towards the third attentiveness level value with a fifth predetermined rate of change in case the following fifth set of conditions is met,
the first signal (S1) indicates safe host vehicle lane position,
the second signal (S2) indicates no torque exerted on the steering wheel, and
the third signal (S3) indicates no pressure exerted on the one or more pedals;
wherein the third attentiveness level value is a value in-between the first and the second attentiveness level values.

6. The vehicle driver assist arrangement according to claim 1 where the processing unit is configured to change the attentiveness level value in a direction towards the first attentiveness level value with a sixth predetermined rate of change in case the following sixth set of conditions is met,
the first signal indicates a safe host vehicle lane position,
the second signal indicates no torque exerted on the steering wheel, and
the third signal indicates pressure exerted on the one or more pedals.

7. The vehicle driver assist arrangement according to claim 1 wherein the processing unit is configured to change the attentiveness level value in a direction towards the first attentiveness level value with a seventh predetermined rate of change in case the following seventh set of conditions is met,
the first signal indicates a safe host vehicle lane position,
the second signal indicates torque exerted on the steering wheel, and
the third signal indicates no pressure exerted on the one or more pedals;
wherein the seventh predetermined rate of change being higher than the sixth predetermined rate of change.

8. The vehicle driver assist arrangement according to claim 1 wherein the processing unit is configured to change the attentiveness level value in a direction towards the first attentiveness level value with an eighth predetermined rate of change in case the following eighth set of conditions is met,
the first signal indicates a safe host vehicle lane position,
the second signal indicates torque exerted on the steering wheel, and
the third signal indicates pressure exerted on the one or more pedals;
wherein the eighth predetermined rate of change being higher than the seventh predetermined rate of change.

9. The vehicle driver assist arrangement according to claim 1 wherein the vehicle driver attentiveness assessment arrangement further comprises a vehicle driver gaze direction monitoring unit which is configured to detect a vehicle driver gaze direction and to transmit a fourth signal indicative of vehicle driver gaze direction to the processing unit, where the processing unit is configured to further assess the level of vehicle driver attentiveness on the basis of the fourth signal.

10. The vehicle driver assist arrangement according to claim 1 wherein the output unit is configured to continue to issue the alert while the assessed level of vehicle driver attentiveness is below the predetermined threshold attentiveness level, and wherein the issue of the alert involves a series of actions comprising at least a first and a second action where the second action is arranged to be more intrusive to a vehicle driver than the first action and where the second action is arranged to be initiated a predetermined time after the first action.

11. The vehicle driver assist arrangement according to claim 10 wherein the vehicle driver attentiveness assessment arrangement further comprises a vehicle driver gaze direction monitoring unit which is configured to transmit a fourth signal indicative of vehicle driver gaze direction to the processing unit, the output unit comprises a display and the alert comprises display of a symbol on the display, and the predetermined time by which the second action is arranged to be initiated after the first action is reduced in case the fourth signal indicates that a vehicle driver gaze direction is not in a direction towards the symbol displayed.

12. The vehicle driver assist arrangement according to claim 10 further comprising an autonomous vehicle steering system and/or an autonomous vehicle brake system, wherein the series of actions comprises at least one action comprising an autonomous intervention in the steering of the host vehicle by the autonomous vehicle steering system and/or an autonomous stopping of the host vehicle by the autonomous vehicle brake system.

13. A vehicle comprising a vehicle driver assist arrangement according to claim 1.

14. A method of assisting a vehicle driver using a vehicle driver assist arrangement for a host vehicle, the vehicle driver assist arrangement comprising an output unit and a vehicle driver attentiveness assessment arrangement comprising a host vehicle lane position evaluation unit, a steering wheel torque detection unit, a pedal pressure detecting unit, and a processing unit, the method comprising:
  evaluating a host vehicle lane position using the host vehicle lane position evaluation unit;
  transmitting a first signal indicative of a safe and/or unsafe host vehicle lane position to the processing unit;
  detecting a torque exerted on the steering wheel of the host vehicle using the steering wheel torque detection unit;
  transmitting a second signal indicative of the torque exerted on the steering wheel to the processing unit;
  detecting a pressure exerted on a pedal of the host vehicle using the pedal pressure detecting unit;
  transmitting a third signal indicative of the pedal pressure to the processing unit;
  assessing a level of vehicle driver attentiveness on the basis of the first, the second and the third signals using the processing unit;
  determining using the processing unit a value representative of the level of vehicle driver attentiveness, where the attentiveness level value is within a range between a first attentiveness level value corresponding to an attentiveness level in which the driver is assumed to be fully attentive and a second attentiveness level value corresponding to an attentiveness level in which the driver is assumed to be inattentive, the second attentiveness level value corresponding to a predetermined threshold attentiveness level;
  changing using the processing unit the attentiveness level value with a predetermined rate of change on the basis of the first, the second and the third signal; and
  issuing an alert, via the output unit, in case the assessed level of vehicle driver attentiveness is below the predetermined threshold attentiveness level.

15. A vehicle driver assist arrangement for a host vehicle, the arrangement comprising:
  an output unit; and
  a processing unit configured to assess a level of vehicle driver attentiveness on the basis of a first signal received from a host vehicle lane position evaluation unit configured to evaluate a host vehicle lane position and transmit the first signal indicative of a safe and/or unsafe host vehicle lane position, a second signal received from a steering wheel torque detection unit configured to detect a torque exerted on a steering wheel of the host vehicle and to transmit the second signal indicative of the torque exerted on the steering wheel to the processing unit, and a third signal received from a pedal pressure detecting unit configured to detect a pressure exerted on a pedal of the host vehicle and to transmit the third signal indicative of the pedal pressure to the processing unit;
  wherein the output unit is configured to issue an alert in case the assessed level of vehicle driver attentiveness is below a predetermined threshold attentiveness level, and wherein the processing unit is configured to determine a value representative of the level of vehicle driver attentiveness, where the attentiveness level value is within a range between a first attentiveness level value corresponding to an attentiveness level in which the driver is assumed to be fully attentive and a second attentiveness level value corresponding to an attentiveness level in which the driver is assumed to be inattentive, the second attentiveness level value corresponding to the predetermined threshold attentiveness level, and the processing unit is configured to change the attentiveness level value with a predetermined rate of change on the basis of the first, the second and the third signal.

* * * * *